United States Patent
Besliu et al.

(10) Patent No.: US 11,242,041 B2
(45) Date of Patent: Feb. 8, 2022

(54) SLOW RESPONSE SOLENOID HYDRAULIC VALVE, AND ASSOCIATED SYSTEMS AND METHODS

(71) Applicant: Safran Landing Systems Canada Inc., Ajax (CA)

(72) Inventors: Marin Besliu, Mississauga (CA); Anthony Carr, Brampton (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 261 days.

(21) Appl. No.: 15/960,217

(22) Filed: Apr. 23, 2018

(65) Prior Publication Data
US 2019/0322258 A1  Oct. 24, 2019

(51) Int. Cl.
*F16K 11/07* (2006.01)
*F15B 13/04* (2006.01)
(Continued)

(52) U.S. Cl.
CPC ............ *B60T 8/363* (2013.01); *B60T 8/5043* (2013.01); *B60T 11/34* (2013.01);
(Continued)

(58) Field of Classification Search
CPC ........... B60T 8/34–5093; B60T 8/3665; B60T 8/5012; Y10T 137/2554; Y10T 137/87193; Y10T 137/87209; Y10T 137/87217; Y10T 137/87225; Y10T 137/87249; Y10T 137/86614; Y10T 137/86582; Y10T 137/8667; Y10T 137/0497; Y10T 137/0502; Y10T 137/5987;
(Continued)

(56) References Cited

U.S. PATENT DOCUMENTS 2,853,096 A * 9/1958 Lee ............................... 137/491
2,918,072 A * 12/1959 Boler ...................... F16K 17/36
137/38
(Continued)

FOREIGN PATENT DOCUMENTS

EP   1762765 A2   3/2007
GB   2104249 A  *  3/1983   .......... F15B 13/0442
(Continued)

OTHER PUBLICATIONS

Webster's II New Riverside University Dictionary, (1994 ed.), pp. 142. (Year: 1994).*
(Continued)

*Primary Examiner* — Craig J Price
(74) *Attorney, Agent, or Firm* — Christensen O'Connor Johnson Kindness PLLC

(57) ABSTRACT

Hydraulic valves for dampening pressure spikes and associated methods are disclosed herein. In one embodiment, a hydraulic valve for dampening pressure spikes includes: a spool configured to move axially inside the hydraulic valve; and a sleeve configured to at least partially house the spool. A location of the spool with respect to the sleeve may determine a flow of a working fluid through the hydraulic valve. A viscous damper is at least partially housed inside an opening in the spool, and a viscous friction between the viscous damper and the opening in the spool slows a motion of the spool.

15 Claims, 15 Drawing Sheets

(51) Int. Cl.
  B60T 8/36 (2006.01)
  B60T 8/50 (2006.01)
  B60T 11/34 (2006.01)
  F16K 47/00 (2006.01)

(52) U.S. Cl.
  CPC ......... *F16K 47/0112* (2021.08); *B60T 8/3665* (2013.01); *F16K 11/07* (2013.01); *Y10T 137/0497* (2015.04); *Y10T 137/0502* (2015.04); *Y10T 137/8667* (2015.04); *Y10T 137/86582* (2015.04); *Y10T 137/87193* (2015.04)

(58) Field of Classification Search
  CPC ......... Y10T 137/6007; Y10T 137/6065; F15B 13/0407; F15B 13/029; F15B 13/043–0446; F15B 13/04; F15B 13/021; F15B 13/0402; F15B 13/0431; F16K 31/06; F16K 31/42; F16K 31/423; F16K 31/426; F16K 11/07; F16K 47/02; F16K 47/04; F16K 31/0603; F16K 47/023; F16K 47/00; F16K 47/01; F16K 47/012; F16K 47/0112
  USPC .... 137/106, 596.14, 596.16, 596.17, 596.18, 137/625.64, 625.6, 625.25, 597, 15.19, 137/15.21, 315.03, 315.09, 315.27; 251/282, 129.01–129.22, 48–55; 91/459, 91/465, 469
  See application file for complete search history.

(56) References Cited

U.S. PATENT DOCUMENTS

| | | | | |
|---|---|---|---|---|
| 2,920,647 A * | 1/1960 | Mercier | ............ | G05D 16/10 137/505.18 |
| 2,961,001 A * | 11/1960 | Pippenger | ............ | F15B 13/0431 137/625.63 |
| 3,086,551 A * | 4/1963 | Gordon | ............ | F16K 17/0433 137/514.5 |
| 3,213,874 A * | 10/1965 | Schmiel | ............ | F15B 13/01 137/106 |
| 3,267,965 A * | 8/1966 | Kroffke | ............ | F15B 13/0431 137/625.64 |
| 3,324,890 A * | 6/1967 | Whitmore | ............ | F16K 11/0716 137/625.69 |
| 3,473,548 A * | 10/1969 | Erickson | ............ | F15B 13/0438 137/85 |
| 3,566,919 A * | 3/1971 | Vanderlaan | ............ | F15B 13/0402 137/625.63 |
| 3,601,013 A * | 8/1971 | Albertson | ............ | F01B 3/0085 91/501 |
| 3,865,514 A * | 2/1975 | Lonnemo | ............ | F04B 49/22 417/212 |
| 3,937,129 A * | 2/1976 | Miller | ............ | F15B 11/165 91/530 |
| 3,949,645 A * | 4/1976 | Masclet | ............ | B64C 25/26 91/459 |
| 4,119,294 A * | 10/1978 | Schnorrenberg | ... | G05D 16/2024 251/129.08 |
| 4,227,549 A * | 10/1980 | Adams | ............ | B62D 5/061 137/625.69 |
| 4,353,394 A * | 10/1982 | Loup | ............ | F16K 11/0704 137/625.65 |
| 4,355,660 A * | 10/1982 | Huffman | ............ | F15B 13/0402 137/625.63 |
| 4,357,955 A * | 11/1982 | Sauer | ............ | F15B 13/02 137/270 |
| 4,406,307 A * | 9/1983 | Loup | ............ | F15B 13/0402 137/625.65 |
| 4,478,250 A * | 10/1984 | Lukasczyk | ............ | G05D 16/2093 137/625.65 |
| 4,643,225 A * | 2/1987 | Imhof | ............ | F15B 13/0402 137/596.17 |
| 4,648,803 A * | 3/1987 | Stephenson | ............ | F04B 49/08 417/214 |
| 4,662,605 A * | 5/1987 | Garcia | ............ | F16K 31/0613 251/129.08 |
| 4,733,495 A * | 3/1988 | Winnicki | ............ | A01M 3/005 43/134 |
| 5,113,894 A | 5/1992 | Yoshida | | |
| 5,120,115 A * | 6/1992 | Schmitt | ............ | B60T 8/4004 303/113.2 |
| 5,150,574 A * | 9/1992 | Hirata | ............ | E02F 9/2232 60/465 |
| 5,251,671 A * | 10/1993 | Hiroki | ............ | B62D 5/08 137/625.65 |
| 5,577,534 A * | 11/1996 | Ward | ............ | F15B 13/0418 137/596.17 |
| 5,617,895 A * | 4/1997 | Pfuhl | ............ | F15B 13/0402 137/625.69 |
| 5,853,028 A * | 12/1998 | Ness | ............ | G05D 16/2024 137/625.65 |
| 5,879,060 A * | 3/1999 | Megerle | ............ | B60T 8/363 251/129.02 |
| 5,894,860 A * | 4/1999 | Baldauf | ............ | B60T 8/3665 137/625.65 |
| 6,029,689 A * | 2/2000 | Arai | ............ | F15B 11/0445 137/106 |
| 6,269,827 B1 * | 8/2001 | Potter | ............ | F15B 13/0402 137/14 |
| 6,374,856 B1 * | 4/2002 | Nitsche | ............ | G05D 16/166 137/625.65 |
| 6,408,877 B2 * | 6/2002 | Venditti | ............ | F16K 31/0613 137/596.17 |
| 6,568,768 B1 * | 5/2003 | Oka | ............ | B60T 13/72 303/113.3 |
| 6,668,478 B2 * | 12/2003 | Bergstrom | ............ | F41A 3/92 42/1.06 |
| 9,115,730 B2 * | 8/2015 | Schulz | ............ | F16K 31/426 |
| 9,689,344 B1 * | 6/2017 | Gedeon | ............ | F02G 1/0435 |
| 10,352,469 B2 * | 7/2019 | Eisenberger | ............ | F15B 13/0407 |
| 10,544,877 B2 * | 1/2020 | Zaiser | ............ | G05D 16/2024 |
| 2003/0010390 A1 * | 1/2003 | Beck | ............ | F15B 13/0857 137/884 |
| 2004/0104371 A1 * | 6/2004 | Hironaka | ............ | F16K 31/0665 251/129.15 |
| 2004/0173264 A1 * | 9/2004 | Holder | ............ | F16K 17/0433 137/494 |
| 2007/0056644 A1 * | 3/2007 | Boddy | ............ | F16K 31/061 137/625.65 |
| 2009/0101216 A1 | 4/2009 | Donders | | |
| 2010/0181158 A1 * | 7/2010 | Macht | ............ | F15B 21/008 192/85.01 |
| 2013/0020859 A1 * | 1/2013 | Maki | ............ | B60W 10/08 303/3 |
| 2013/0146799 A1 | 6/2013 | Sasao | | |
| 2013/0277585 A1 | 10/2013 | Van Weelden | | |
| 2014/0083381 A1 * | 3/2014 | Roberts | ............ | F01L 1/08 123/90.15 |

FOREIGN PATENT DOCUMENTS

| | | | |
|---|---|---|---|
| GB | 2524648 B | 9/2015 | |
| JP | S59126184 A | 7/1984 | |
| JP | 2001165349 A | 6/2001 | |
| WO | 90/12973 A1 | 11/1990 | |
| WO | WO-2004106751 A1 * | 12/2004 | ......... F15B 13/0407 |

OTHER PUBLICATIONS

Translation of WO2004106751A1, [retrieved from the internet on Jan. 16, 2021, taken from www.espacenet.com] (Year: 2004).*
Extended European Search Report dated Aug. 16, 2019, issued in corresponding European Application No. 19168242.6, filed Apr. 9, 2019, 8 pages.

(56) References Cited

OTHER PUBLICATIONS

European Examination Report dated Dec. 15, 2020, issued in corresponding European Application No. 19168242.6, filed Apr. 9, 2019, 8 pages.

* cited by examiner

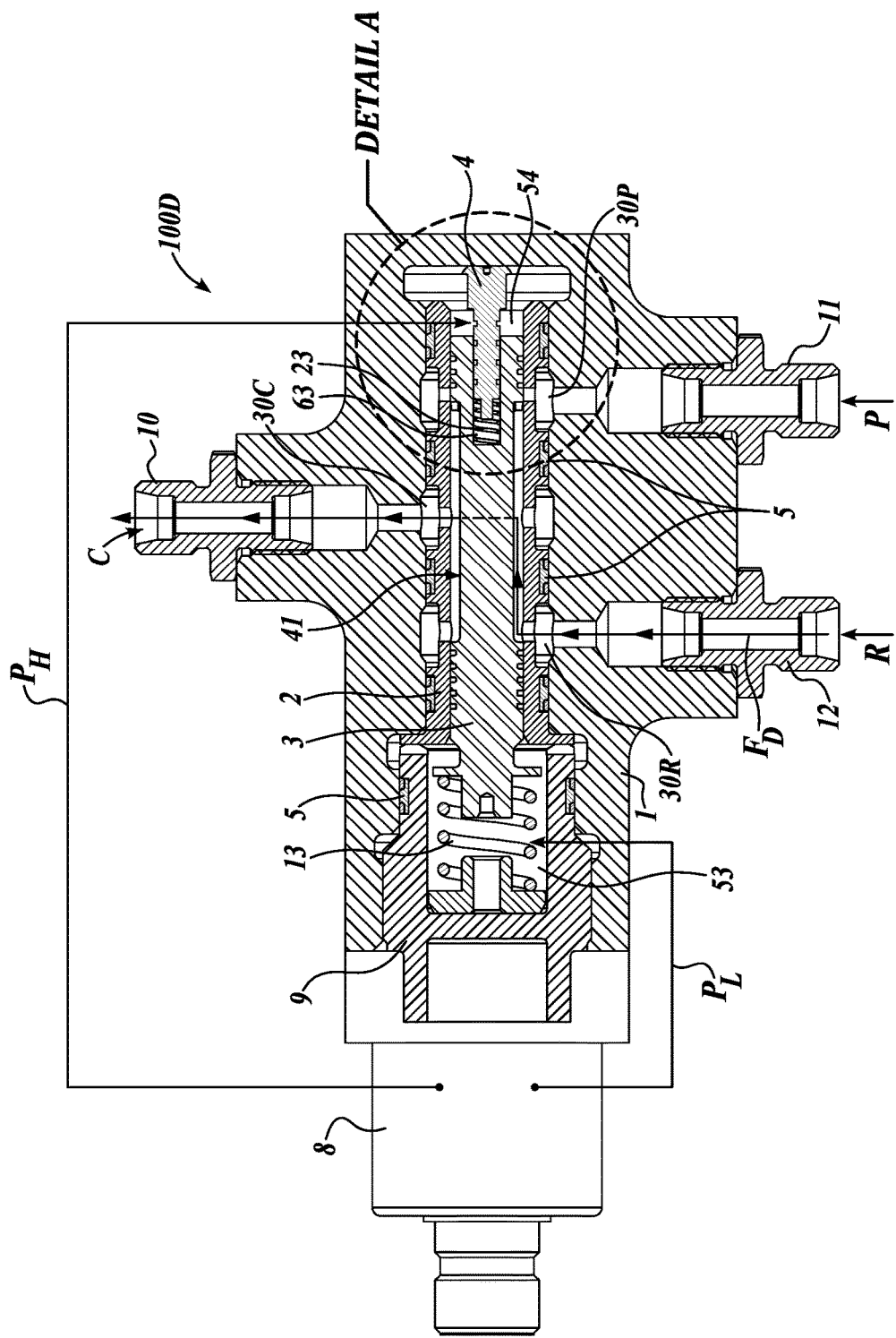

DETAIL A

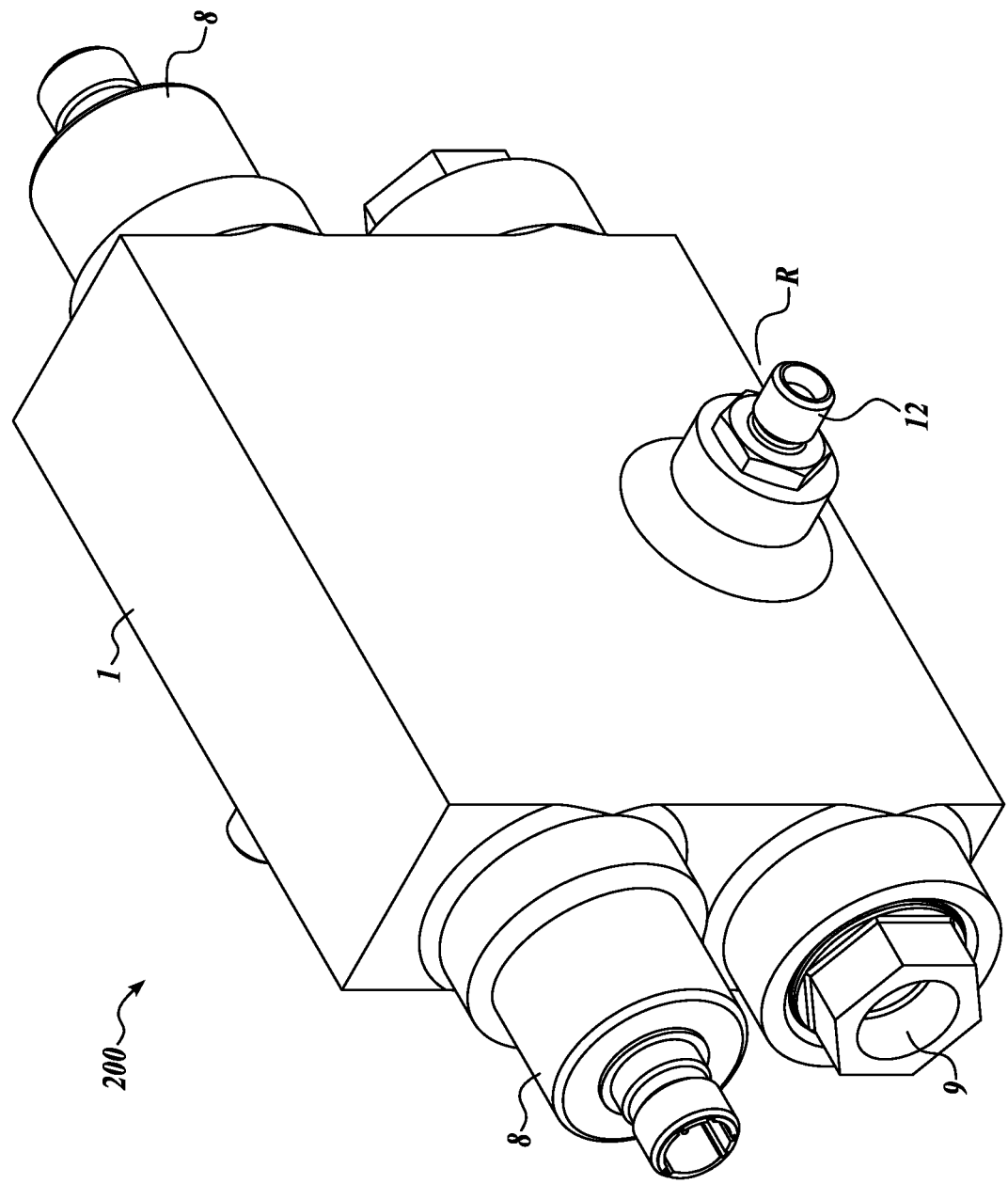

DETAIL B

SLOW RESPONSE SOLENOID HYDRAULIC VALVE, AND ASSOCIATED SYSTEMS AND METHODS

BACKGROUND

Hydraulic systems may produce pressure spikes (also called "water hammer" spikes or events). These pressure spikes are sometimes caused by actuation of the components in the hydraulic system that produces fast transient pressure fields travelling through the system. This transition from one pressure to another may last only 5-20 ms, resulting in large pressure spikes applied to hydraulic components. Generally, the pressure spikes are undesirable because of possible damage to hydraulic components, cavitation (e.g., at the pumps), temporary loss of performance of the components, changes in the properties of the hydraulic fluids, etc. The pressure spikes can be especially undesirable in the hydraulic systems of vehicles, for example trucks or airplanes.

Some conventional technologies attempt to reduce pressure spikes by incorporating hydraulic restrictors into hydraulic lines or hydraulic ports. Such restrictors can be made by reducing pipe diameter. These restrictors generally reduce the rate of change of pressure in the hydraulic flow, therefore also reducing the pressure spikes.

However, these conventional technologies also decrease system performance and increase energy consumption of the hydraulic system by increasing the pressure drop across these purposely created restrictors. Furthermore, in some cases the additional flow resistance generates extra heat in the hydraulic fluid and may also cause silting. Additionally, once the conventional flow resistance is created, it will consistently affect the pressures in the system, whether the pressure spike is present or not. Accordingly, it would be advantageous to provide systems for reducing pressure spikes having improved performance and reduced cost.

DESCRIPTION OF THE DRAWINGS

The foregoing aspects and many of the attendant advantages of the inventive technology will become more readily appreciated with reference to the following detailed description, when taken in conjunction with the accompanying drawings, wherein:

FIGS. 4A and 4B are cross-sectional views of a single spool-end hydraulic dampening valve in accordance with the present technology;

FIGS. 5A and 5B are isometric views of a dual spool-end hydraulic dampening valve in accordance with the present technology;

DETAILED DESCRIPTION

The following disclosure describes various embodiments of systems and associated methods relating to reducing pressure spikes, etc. A person skilled in the art will also understand that the technology may have additional embodiments, and that the technology may be practiced without several of the details of the embodiments described below with reference to FIGS. 3-9.

Briefly described, methods and devices for dampening hydraulic pressure spikes are disclosed. The pressure spikes may be caused by actuation of the components in the hydraulic system, for example, by opening and closing solenoid valves, etc. These hydraulic pressure spikes are also referred to as "water hammers" or "hydraulic spikes." In some embodiments, the hydraulic valve may include a spool that slides along a sleeve to open the valve to either a flow of high pressure working fluid or a flow of low pressure working fluid to the end user (e.g., a hydraulic actuator or a hydraulic brake). In some embodiments, the repositioning of the spool from one position to another may be slowed down by one or more viscous dampers (also referred to as "hydraulic dampers") at the ends of the spool. By slowing down the motion of the spool, a transition from one pressure level to another is also slowed down, resulting in smaller pressure spikes in the hydraulic circuit.

In some embodiments, the viscous damper relies on small clearance between an outer surface of the damper and an inner surface of a hole in the spool. In some embodiments, the outer surface of the viscous damper may be beveled or axially grooved to selectively increase the clearance between the viscous damper and the spool, therefore locally decreasing the effect of the viscous damping. In some embodiments, the viscous damper may self-center inside the hole in the spool.

Figure 1:
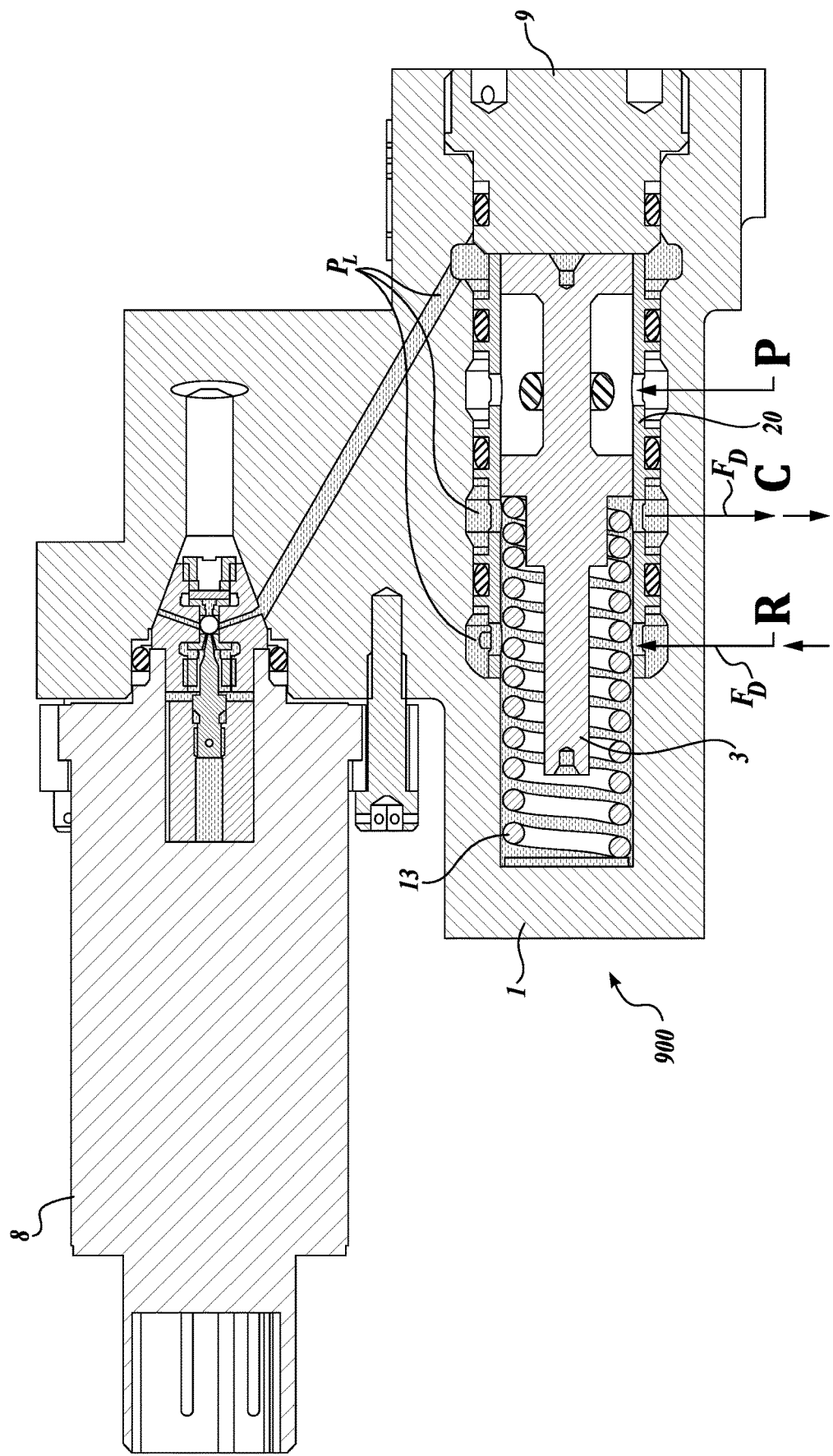
FIG. 1 illustrates a conventional solenoid valve in a de-energized position.

FIG. 1 illustrates a conventional solenoid valve 900 in a de-energized position. In operation, a bias spring 13 pushes a spool 3 to the right hand side, against an end cap 9. A solenoid pilot valve 8 provides a pilot fluid at a low pressure $P_L$, which cannot overcome the force of the spool 3. As a result, openings in a sleeve 20 and a valve body 1 are aligned to provide the working fluid $F_D$ at low pressure (also referred to as the "de-energized working fluid"). In this position, the working fluid $F_D$ enters through an R port of the valve, and is provided to an end user (not shown) through a C port at the low pressure. The end user may be, for example, a hydraulic actuator for a door, hydraulic brakes, a retraction mechanism for aircraft wheels, etc. Therefore, in the illustrated position of the spool 3, the end user is supplied with the working fluid $F_D$ at low pressure ("de-energized working fluid").

Figure 2:
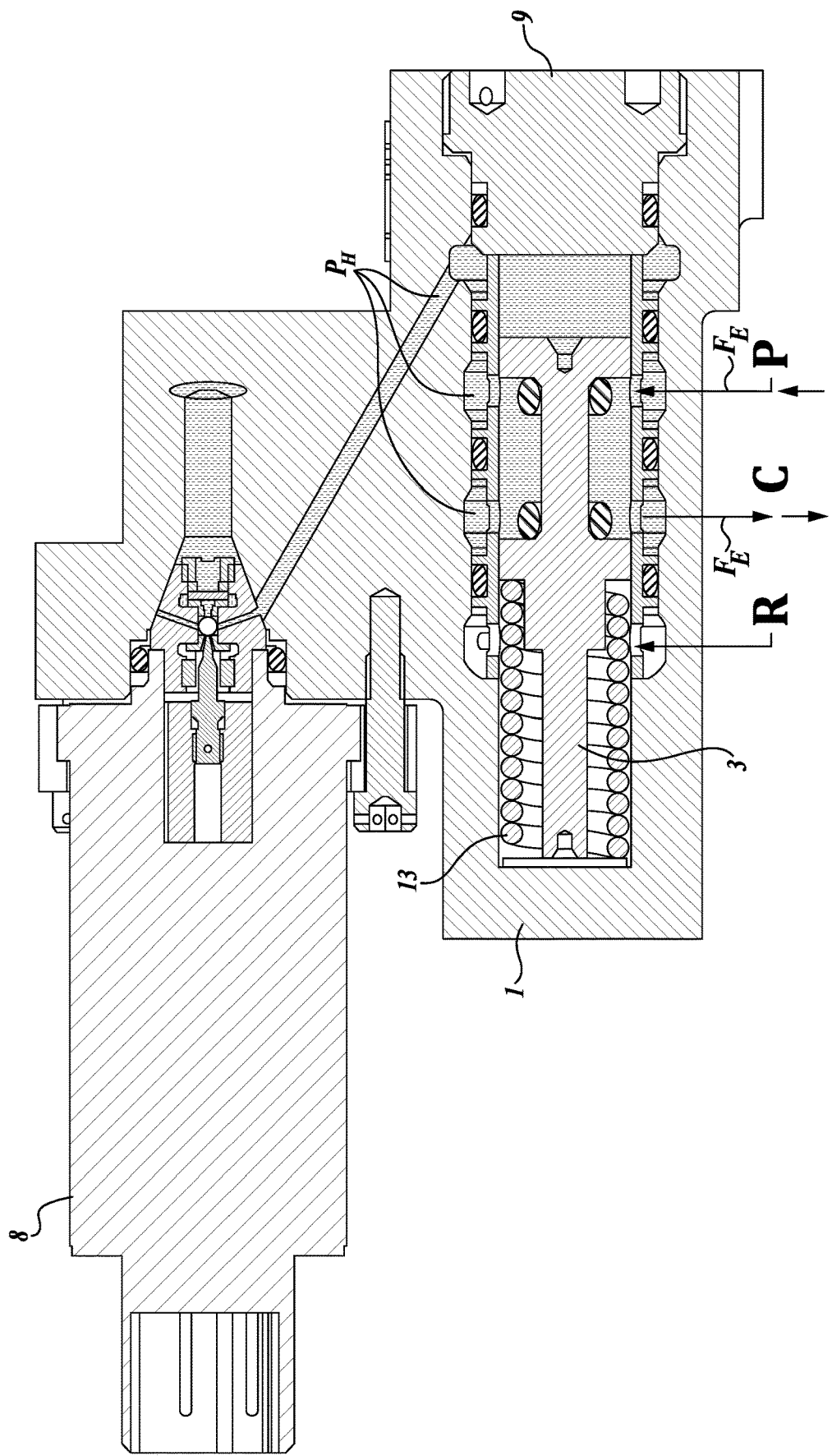
FIG. 2 illustrates a conventional solenoid valve in an energized position.

FIG. 2 illustrates the conventional valve 900 in an energized position. Here, the solenoid pilot valve 8 provides the pilot fluid at a high pressure $P_H$ in the space at the right hind side of the spool 3. The high pressure $P_H$ quickly overcomes the force of the bias spring 13, and pushes the spool 3 to the left. Once the spool 3 is in its new position, the working fluid $F_E$ at high pressure (also referred to as the "energized working fluid") enters through a port P, and flows to the port C. Therefore, the working fluid $F_E$ at high pressure is provided to the end user.

When the low pressure working fluid is wanted by the end user, the process is reversed by providing the pilot fluid at the low pressure $P_L$. With many conventional valves the switching from one position of the spool 3 to another is relatively fast, typically taking place within several milliseconds. As a result, large, potentially damaging pressure spikes are generated inside the hydraulic system.

First Embodiment

Figure 3A:
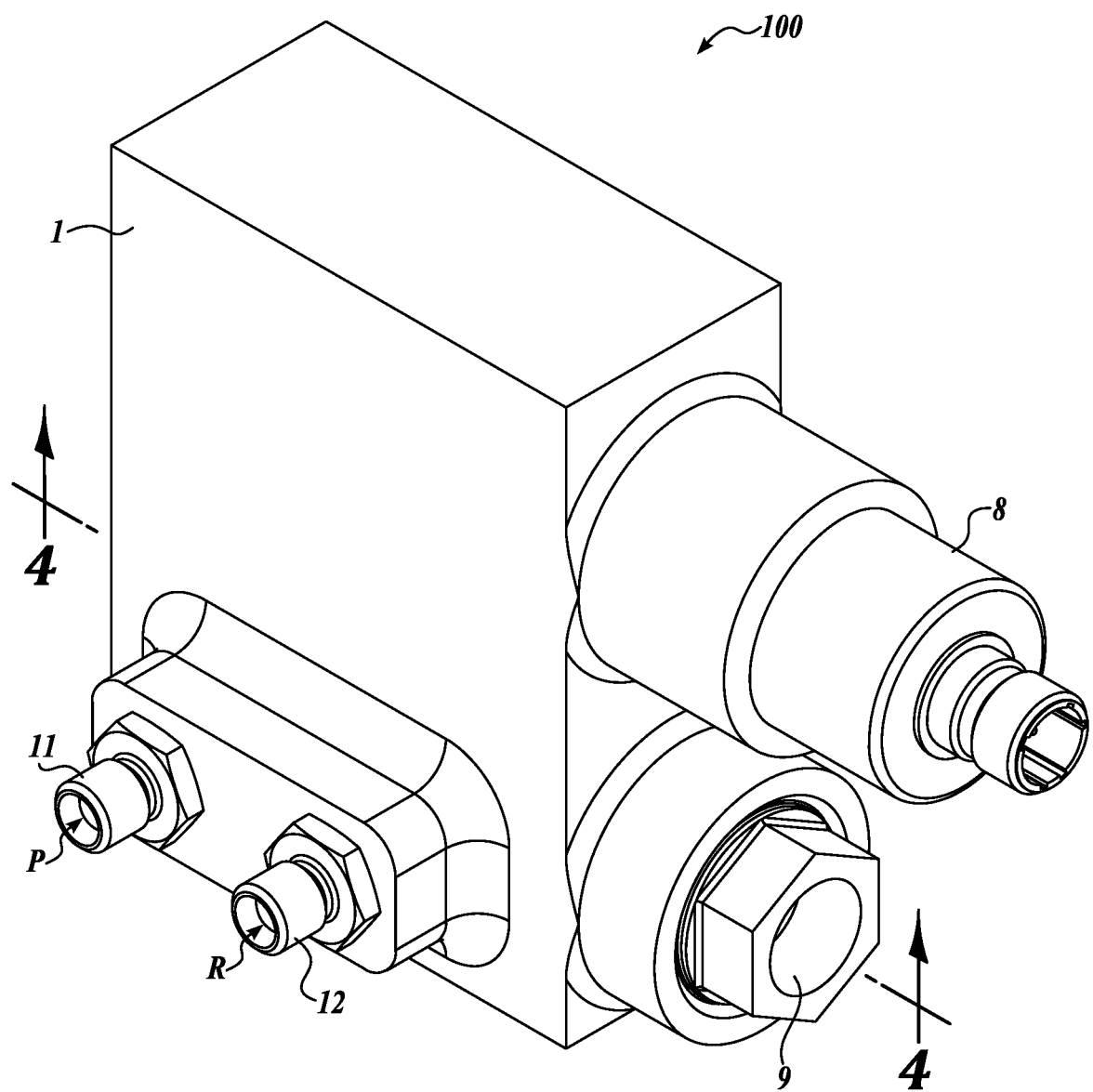
FIGS. 3A and 3B are isometric views of a single spool-end hydraulic dampening valve in accordance with the present technology.
Figure 3B:
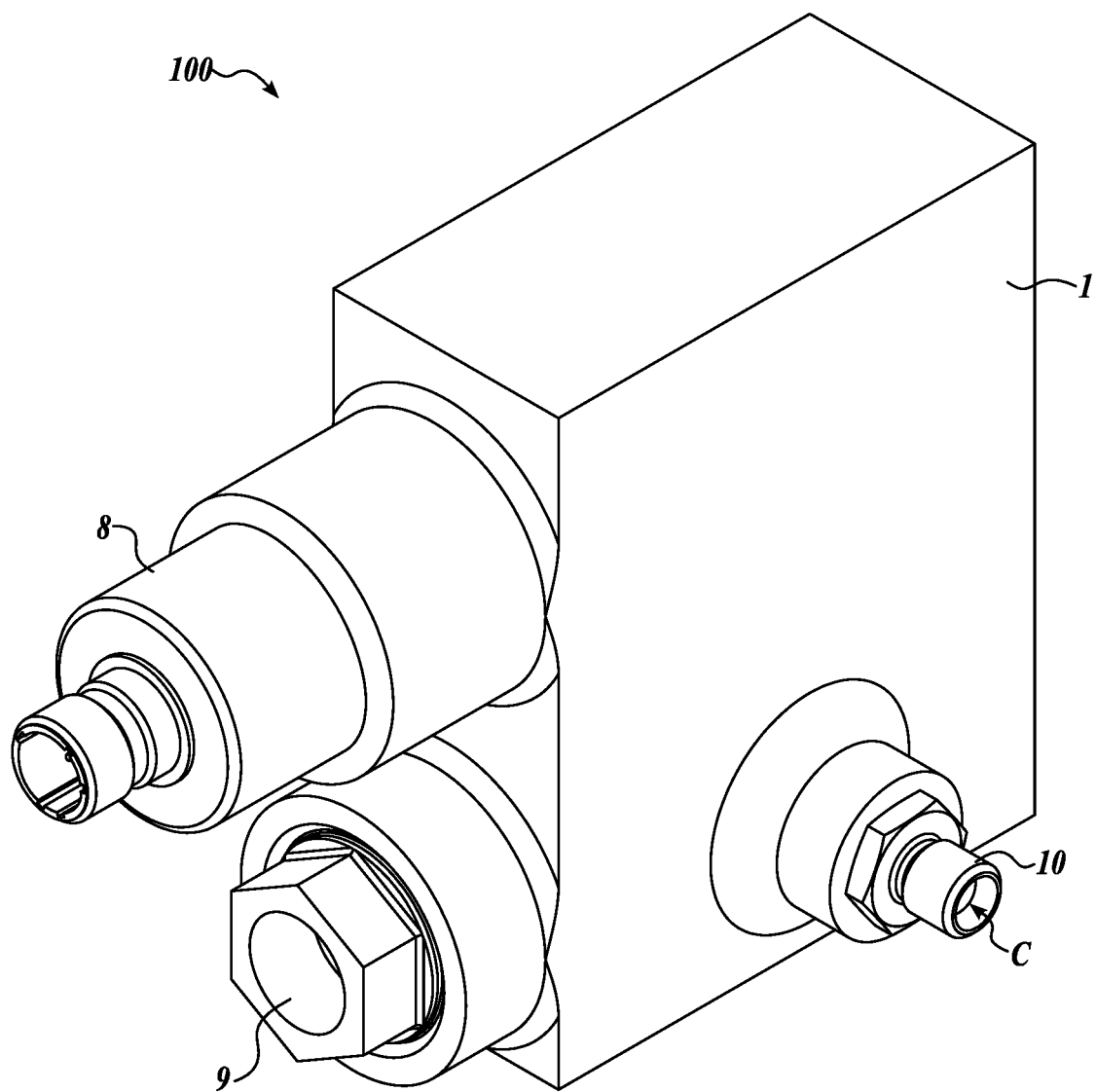

FIGS. 3A and 3B are isometric views of a single spool-end hydraulic dampening valve 100 in accordance with the present technology. The valve 100 has a valve body 1 that may be made of aluminum, steel, titanium or other materials. The ports P (11) and R (12) are the inlets for the high pressure working fluid $F_E$ and the low pressure working fluid $F_D$, respectively. A port C (10) provides working fluid as either high pressure working fluid $F_E$ or the low pressure working fluid $F_D$ to the end user. The solenoid pilot valve 8 provides the pilot fluid to the valve. The operation of the valve 100 in response to changes in the pressure of the pilot fluid is explained with reference to FIGS. 4A and 4B below.

FIG. 4A is a cross-sectional view 4-4 of the single spool-end hydraulic dampening valve 100 in accordance with the present technology. In operation, the solenoid pilot valve 8 can provide the pilot fluid either at the low pressure $P_L$ in a space 53 around the bias spring 13 at the left end of the spool 3, or at the high pressure $P_H$ in a space 54 at the right end of the spool 3.

When the pressure of the pilot fluid is $P_H$, the force of the bias spring 13 is insufficient to push the spool 3 to the right, away from the end cap 9. Instead, the pilot fluid at pressure $P_H$ creates a stronger force that moves the spool to the left. As a result, the working fluid $F_D$ has an available path from the port R, through an opening 30R in the sleeve 2, around the spool 3 in a space 41, through an opening 30C in the sleeve 2, and further toward the end user. Therefore, the illustrated configuration 100D of the valve results in the de-energized (low pressure) working fluid $F_D$ being provided to the end user. In some embodiments, seals 5 prevent leakage of the working fluid and the solenoid valve fluid about the sleeve 2.

In some embodiments, contamination particles (e.g., relatively large particles in the working fluid) can be trapped between the spool 3 and the sleeve 2. Such contamination particles can make the spool "stuck" in the position that provides the energized fluid to the end user, therefore preventing a shutdown the hydraulic power to the end user. In many embodiments, the high pressure $P_H$ of the solenoid fluid generates enough force on the spool 3 to shear the stuck particle, and move the spool 3 to the left. As explained above, once moved to the left, the spool 3 provides a path to the working fluid $F_D$ at the low pressure to the end user at the port C. Generally, providing the working fluid $F_D$ at the low pressure to the end user in case of the valve malfunctioning is a safer alternative than providing the high pressure working fluid $F_E$ in case of the valve malfunctioning.

Figure 4B:
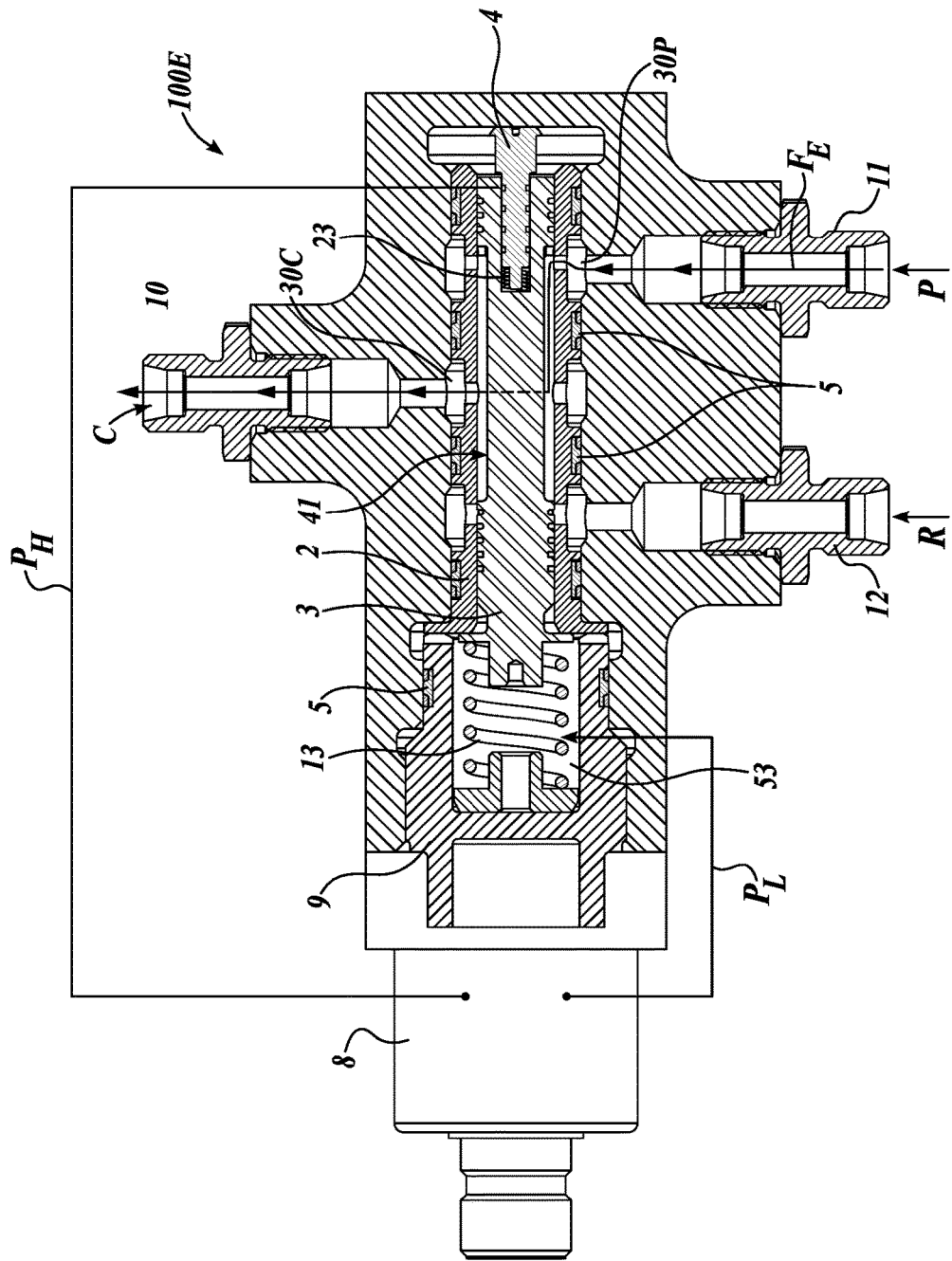

FIG. 4B is a cross-sectional view 4-4 of the single spool-end hydraulic dampening valve 100 in accordance with the present technology. In this case, the solenoid pilot valve 8 provides the pilot fluid at pressure $P_L$ to the left hand side of the spool 3, while the pilot fluid at the right hand side of the spool 3 is depressurized. Therefore, the bias spring 13 pushes the spool 3 to the right, away from the end cap 9. As a result, the high pressure working fluid $F_E$ has an available path from the port P, through an opening 30P in the sleeve 2, around the spool 3 in a space 41, through an opening 30C in the sleeve 2, and further toward the end user. Therefore, the illustrated configuration 100E of the valve results in the energized (high pressure) working fluid being provided to the end user at the port C.

If the contamination particles keep the spool 3 stuck against the sleeve 2, the force of the bias spring 13 may not be high enough to shear the contamination particles and push the spool 3 to its rightmost position. However, under such a scenario the port C would remain connected with the source of the working fluid $F_D$ at the low pressure, which is a safer option when the valve malfunctions.

Figure 4C:
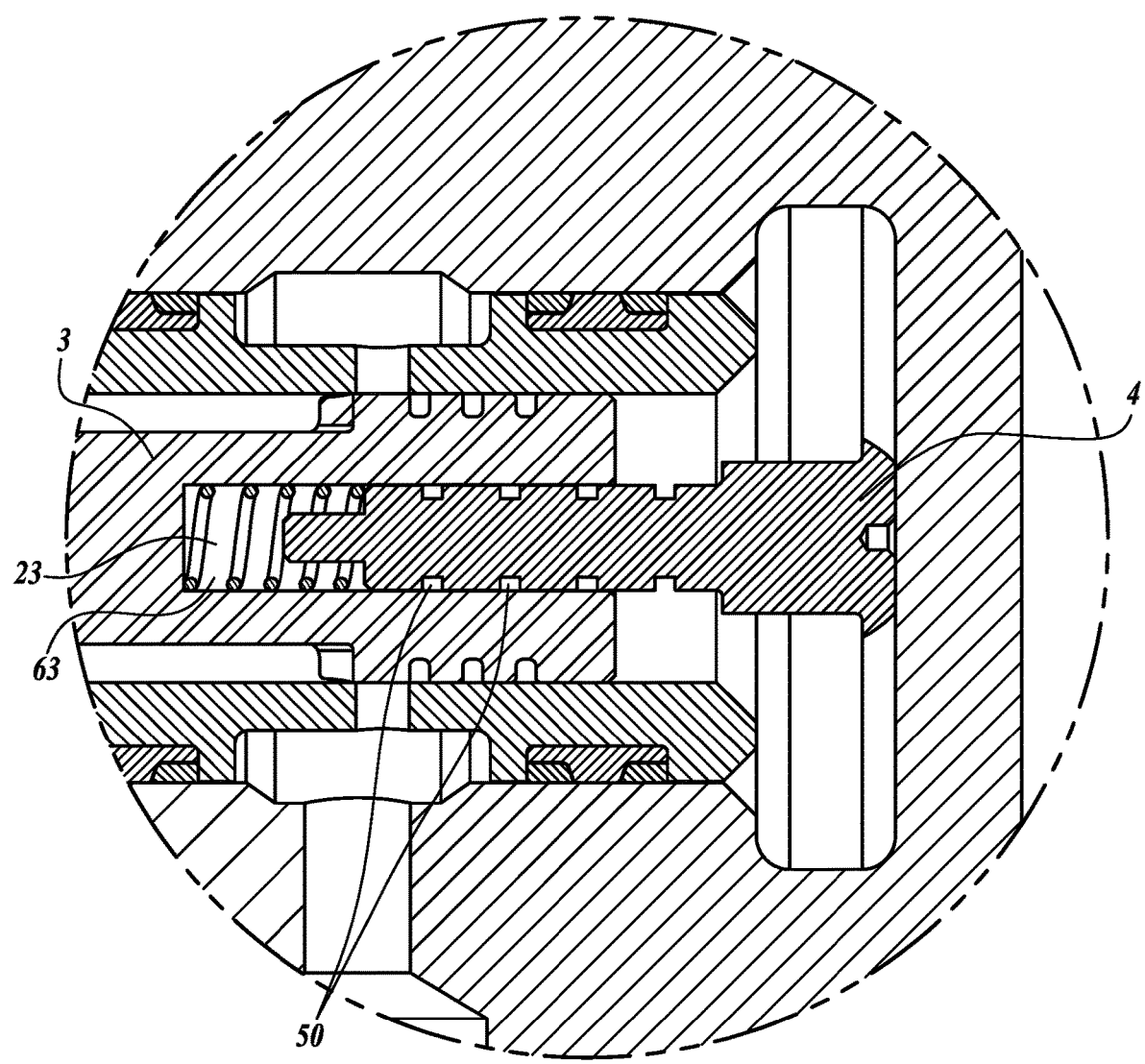
FIG. 4C is a detail of the view shown in FIG. 4A.

FIG. 4C is a detail of the view shown in FIG. 4A. When the spool 3 moves from one position to another, the spool 3 slides over the outer surface of a viscous damper 4. Due to relatively small clearance (e.g., 2-4 µm) between the opening in the spool 3 and the viscous damper 4, viscous friction develops between the spool 3 and the viscous damper 4, therefore slowing the movement of the spool 3, and slowing a switching between the low pressure working fluid $F_D$ and the high pressure working fluid $F_E$ at the outlet C. Furthermore, when the spool 3 moves to the right, the viscous damper 4 moves into a space 63 against the pressure of the pilot fluid, therefore further slowing the switching between the low pressure working fluid $F_D$ and the high pressure working fluid $F_E$ at the outlet C.

In some embodiments, the amount of viscous damping is controlled by the magnitude of the clearance between the opening in the spool 3 and the viscous damper 4 and the axial length of the viscous damper 4. As a result of viscous damping, the pressure spikes inside the valve 100 and/or at the end user are reduced. In some embodiments, the viscous damper 4 includes one or more radial grooves 50 for centering the viscous damper inside the space 63 and for making the viscous friction more even. Furthermore, the radial grooves 50 may reduce the incidence or likelihood of the viscous damper 4 being stuck inside the spool 3. Without the radial grooves 50, the damper 4 may get "hydraulically locked" inside the space 63 in the spool 3. In some embodiments, a spring 23 in the space 63 is used for biasing of the viscous damper 4.

Second Embodiment

Figure 5A:
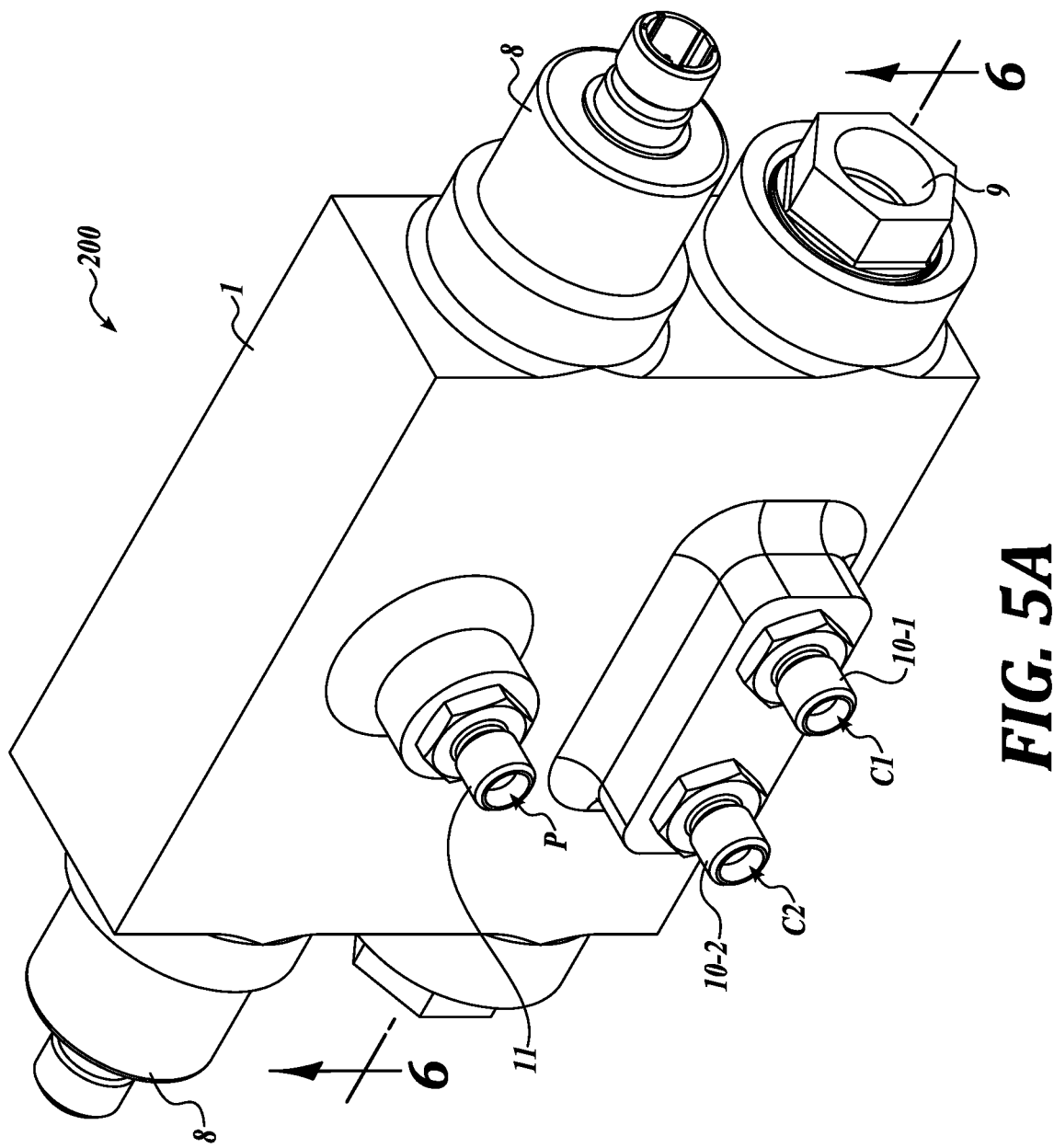

FIGS. 5A and 5B are isometric views of a dual spool-end hydraulic dampening valve 200 in accordance with the present technology. In the illustrated embodiment, the valve 200 may separately service two end users through the ports C1 and C2. The port P for the high pressure working fluid $F_E$ is opposite from the port R for the low pressure working fluid $F_D$, but in other embodiments the ports P and R may be on the same side of the valve 200.

Figure 6A:
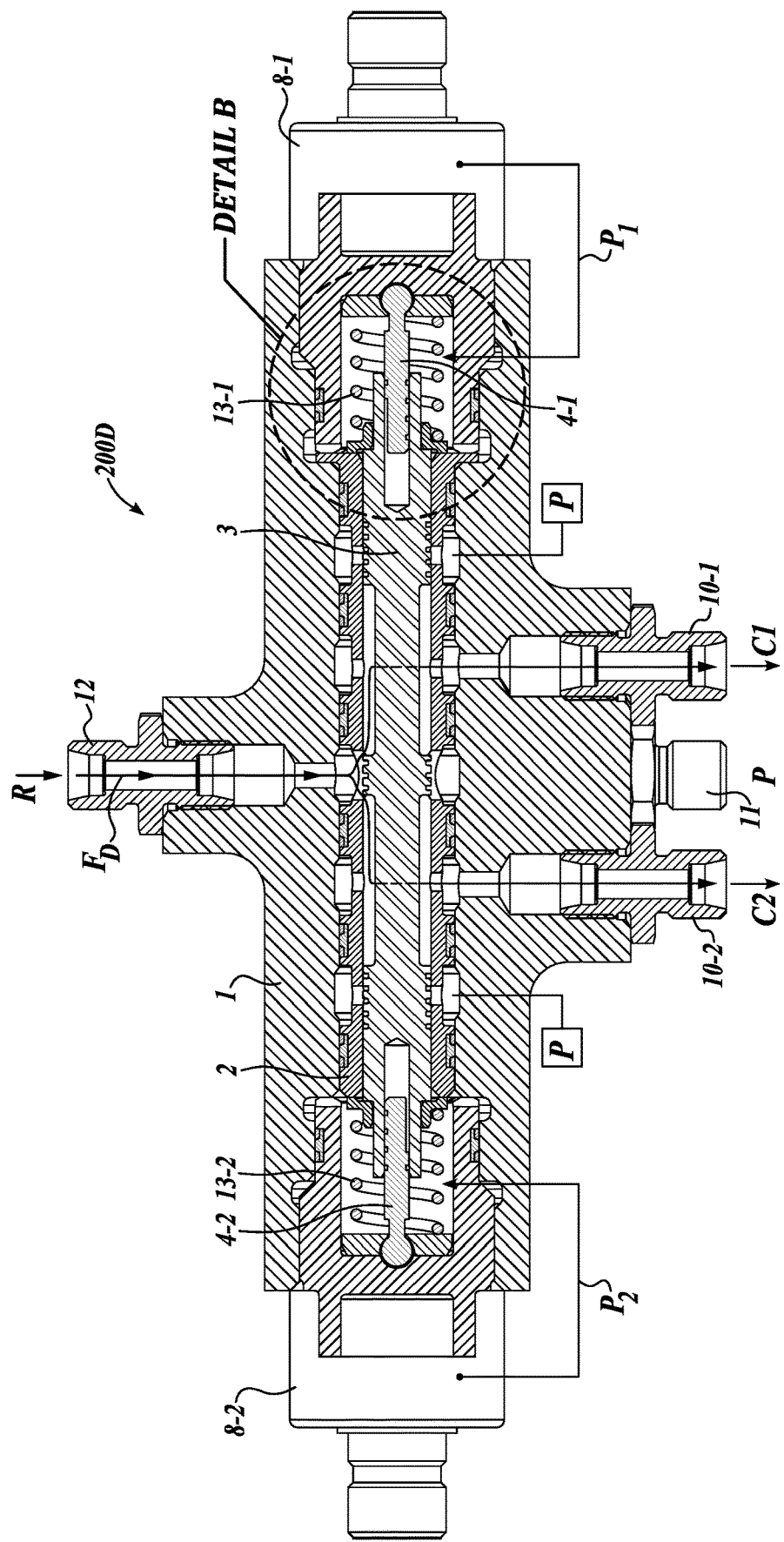
FIGS. 6A and 6B are cross-sectional views of a dual spool-end hydraulic dampening valve in accordance with the present technology.

FIG. 6A is a cross-sectional view 6-6 of the dual spool-end hydraulic dampening valve 200 in accordance with the present technology. The dual spool-end hydraulic dampening valve 200 includes solenoid pilot valves 8-1 and 8-2. In some embodiments, the solenoid pilot valves 8-1 and 8-2 work in tandem to keep the valve in in a de-energized operating configuration 200D as described below.

In some embodiments, the solenoid pilot valves 8-1 and 8-2 provide pilot fluid at the opposing ends of the spool 3. For example, when both solenoid pilot valves 8-1 and 8-2 provide low pressure $P_L$ or high pressure $P_H$ simultaneously, the spool 3 is kept in balance at around its center position. In practice, even if the two pressures provided by the two solenoid pilot valves are not exactly the same, the springs 13-1 and 13-2 at the opposite ends of the spool 3 tend to keep the spool centered. As a result, the low pressure working fluid $F_D$ enters the valve 200 at the port R, and is distributed to the two outlet ports C1, C2, and further to the end users.

Figure 6B:
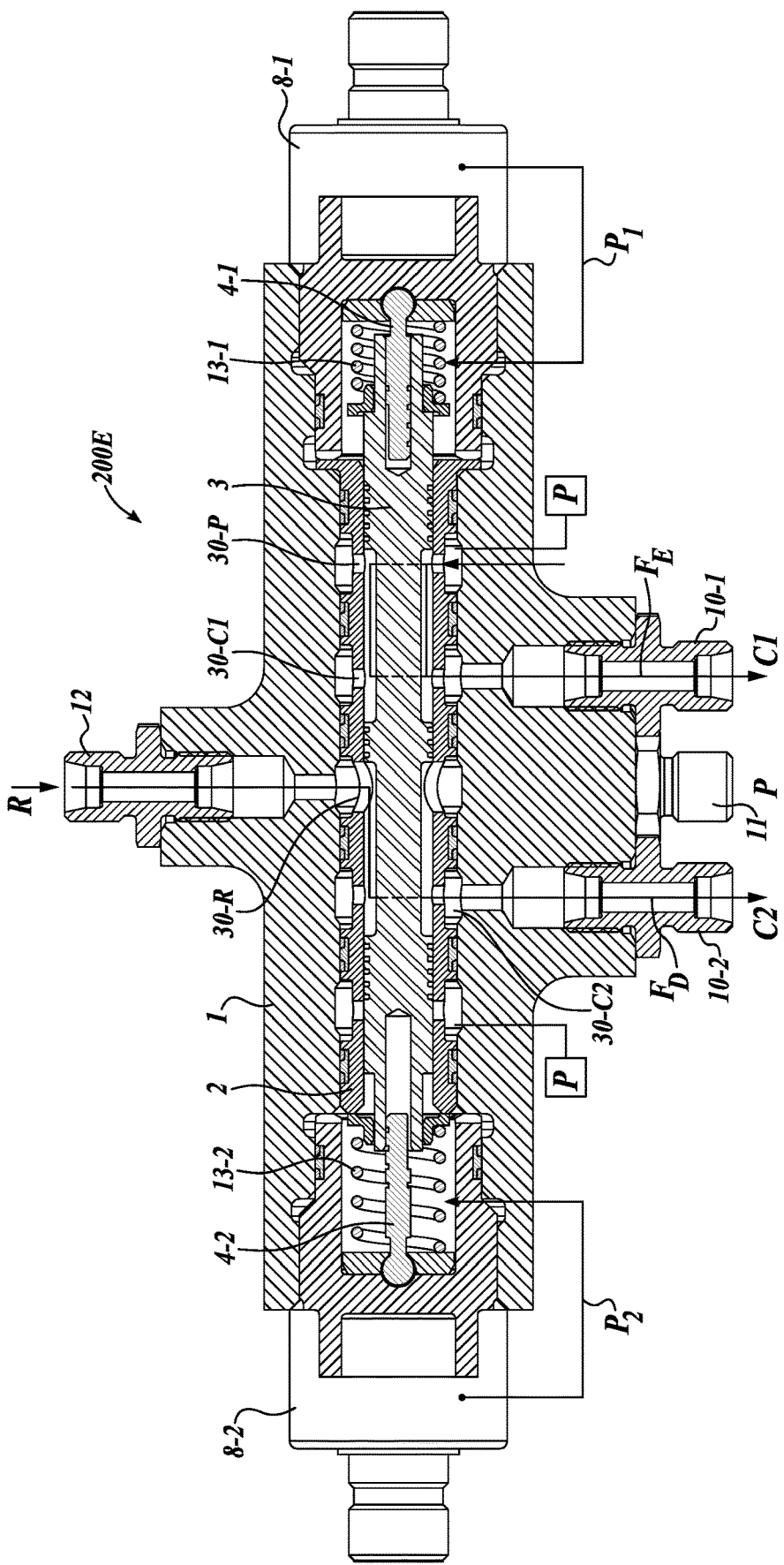

FIG. 6B shows the valve in an energized operating configuration 200E. In some embodiments, the solenoid valve 8-2 provides a pilot pressure $P_2$ that is higher than a pilot pressure $P_1$ provided by the solenoid valve 8-1. As a result, the spool 3 is pushed to the right, therefore aligning the outlets 30-P and 30-C1 against a space about the spool 3. Therefore, the outlet C1 is now supplied with the energized working fluid $F_E$. Conversely, the outlets 30-R and 30-C2 are also in a fluid communication, therefore supplying the de-energized working fluid $F_D$ to the outlet C2. Furthermore, when the values of the pressures $P_1$ and $P_2$ are switched, the spool 3 is pushed to the left side, therefore switching the supply of the energized working fluid $F_E$ to the outlet C2, and the supply of the de-energized working fluid $F_D$ to the outlet C1.

Figure 6C:
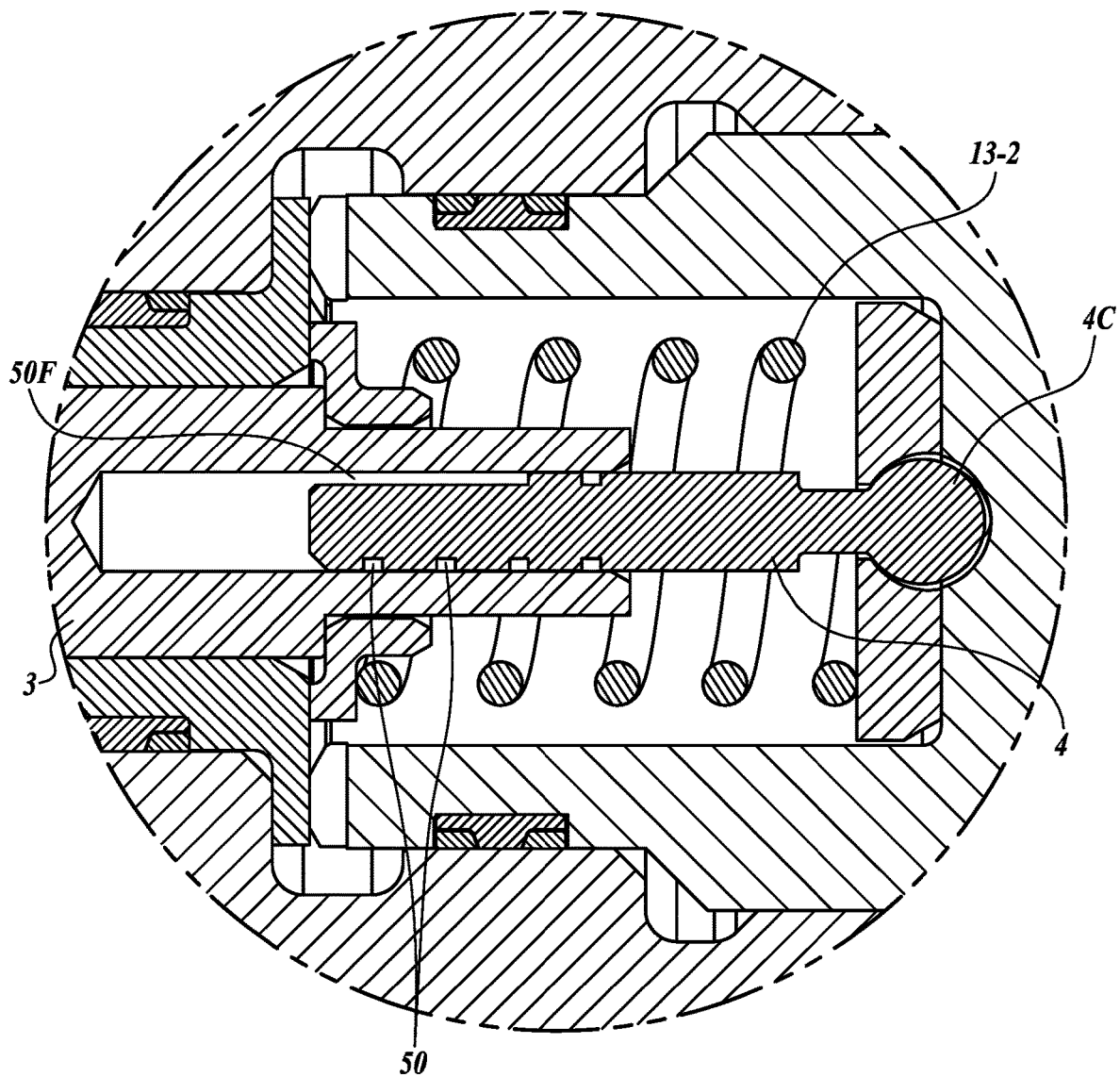
FIG. 6C is a detail of the view shown in FIG. 6A.

FIG. 6C is a detail of the view shown in FIG. 6A. In some embodiments, the viscous damper 4 includes a round end 4C that improves the alignment of the viscous damper 4 against the spool 3 by self-centering the viscous damper 4. In different embodiments, the round end 4C may be spherical, elliptical, conical, or may have other shapes that improve self-centering.

In some embodiments, the viscous damper 4 may include a an axial groove 50F along a portion of its length. In operation, the axial groove 50F effectively increases the clearance between the viscous damper 4 and the opening in the spool 3, therefore decreasing the viscous force. As a result, the viscous damper 4 may exhibit different viscous damping. For example, when the axial groove 50F predominates the engaged length of the viscous damper 4, the viscous damping is reduced. Conversely, when the engaged length includes significant length of the full diameter of the viscous damper 4, the viscous damping increases. The opposing viscous damper may include analogous axial groove 50F. In some embodiments, the chamfered features of the two viscous dampers may combine into four different viscous damping properties: both axial grooves dominate the viscous force, one axial groove on each side dominates the viscous force, and the portions of the viscous dampers without axial grooves dominate the viscous force. In some embodiments, these combinations may be used for improved control of the speed by which the spool 3 moves along the sleeve 2.

Figure 7:
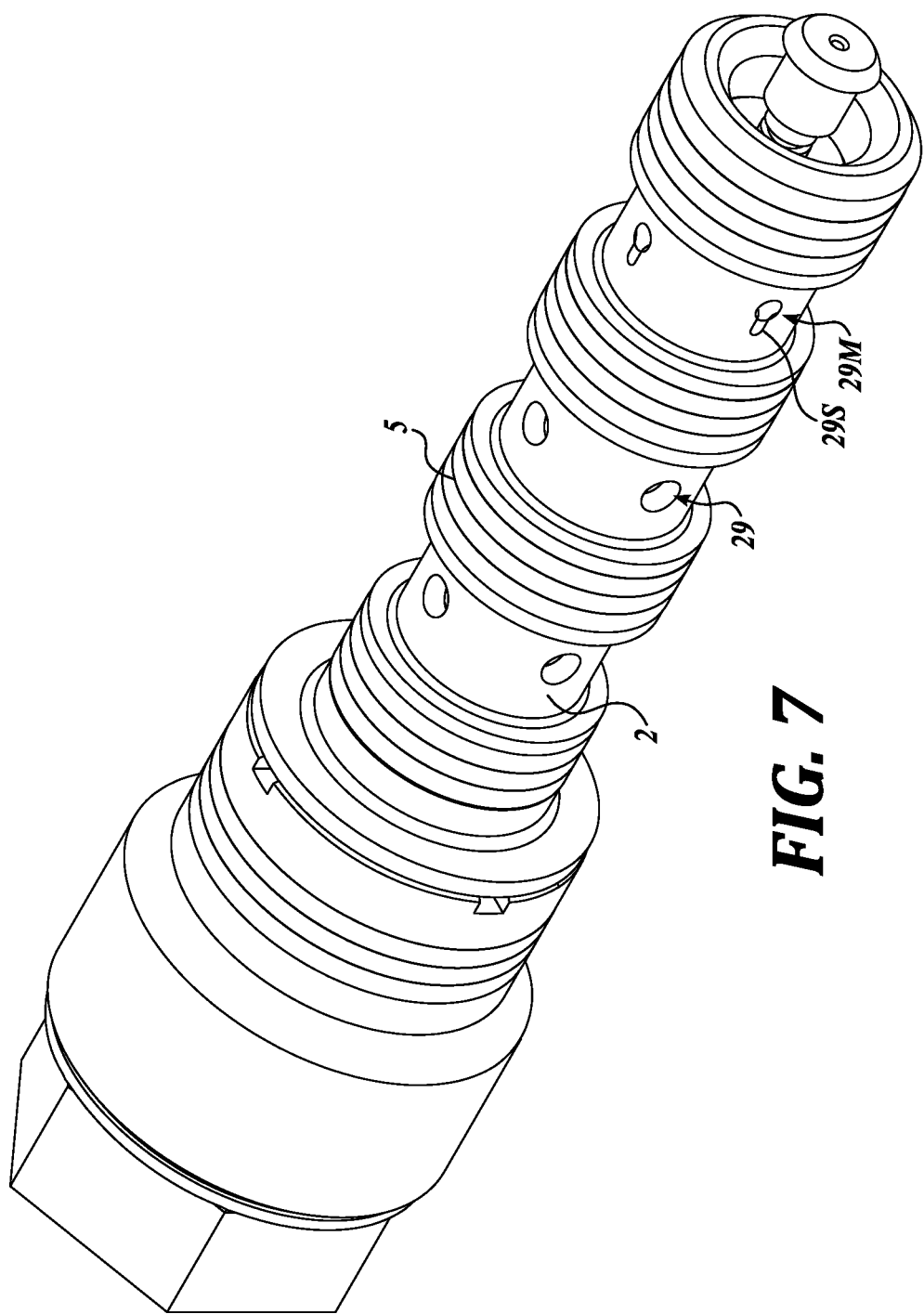
FIG. 7 is an isometric view of a sleeve of the hydraulic dampening valve in accordance with the present technology.

FIG. 7 is an isometric view of a sleeve of the hydraulic dampening valve in accordance with the present technology. The illustrated sleeve 2 includes openings 29 for the flow of working fluid through the sleeve. In some embodiments, the sleeve 2 may include one or more modified openings 29M having a scallop opening 29S. In operation, as the spool 3 slides along the sleeve 2, the scallop opening 29S engages first with the cooperating opening in the spool, therefore limiting the amount of the working fluid that can flow through the openings 29M. As the spool 3 continues to slide along the sleeve 2, the non-scalloped portion of the opening 29M engages with the cooperating opening in the spool, therefore increasing the flow of the working fluid. In some embodiments, this gradual increase of the flow of the working fluid may further decrease the incidence or the severity of the pressure spikes in the system.

Third Embodiment

Figure 8:
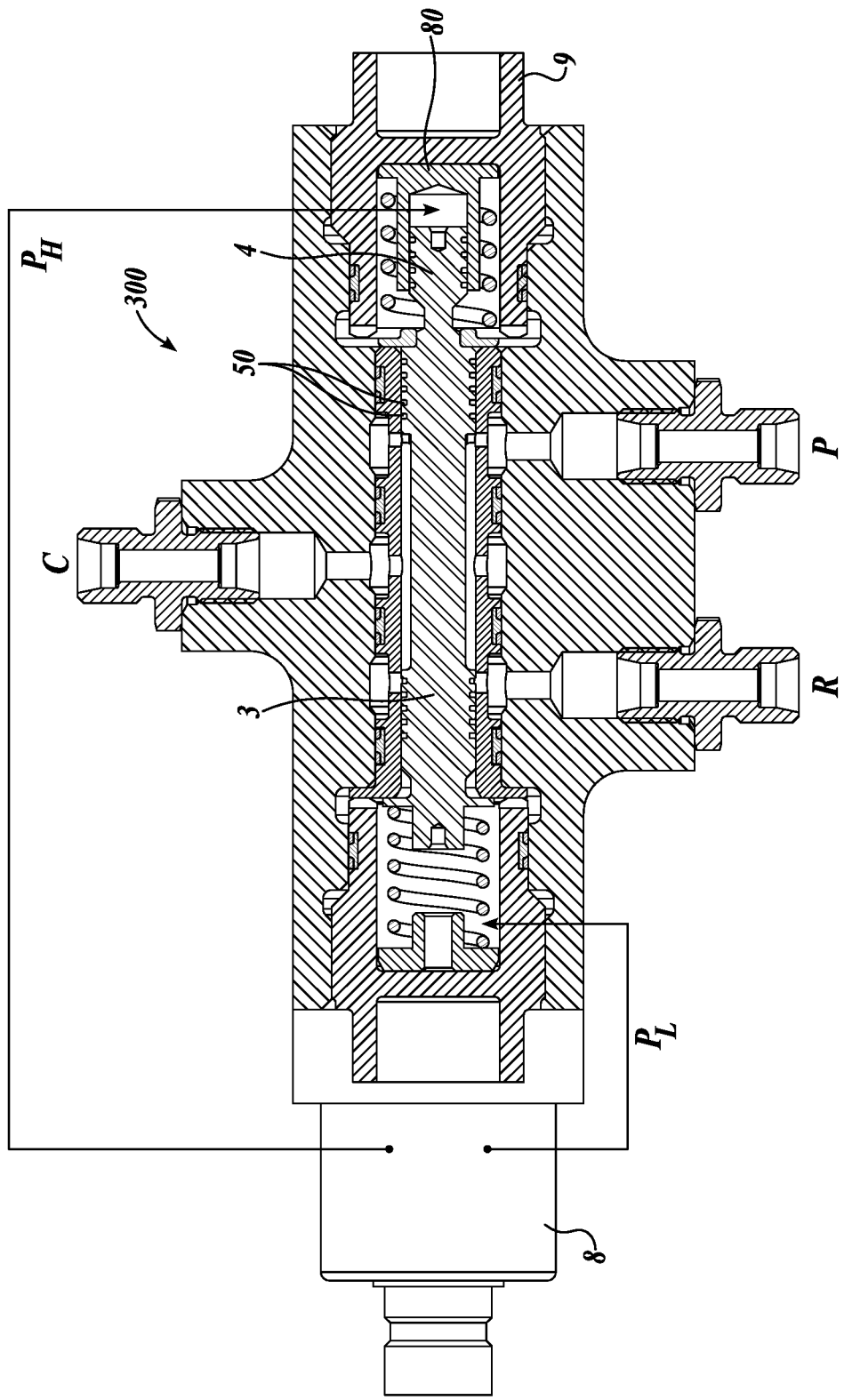
FIG. 8 is a cross-sectional view of a single spool-end hydraulic dampening valve in accordance with the present technology.

FIG. 8 is a cross-sectional view of a single spool-end hydraulic dampening valve 300 in accordance with the present technology. In the illustrated embodiment, the viscous damper 4 is integral with the spool 3. In some embodiments, clearance between the viscous damper 4 and a cushion 80 may be selected such that the motion of the viscous damper 4 generates viscous forces between the viscous damper 4 and the cushion 80. Some non-limiting examples of the clearance between the viscous damper 4 and the cushion 80 are 2-4 µm, 1-10 µm and 2-20 µm, but other ranges are also possible. As explained above, the viscous forces may reduce the incidence and/or severity of the pressure spikes. In some embodiments, the cushion 80 may also improve self-centering of the spool 3. The cushion 80 may be supported by the end cap 9.

Fourth Embodiment

Figure 9:
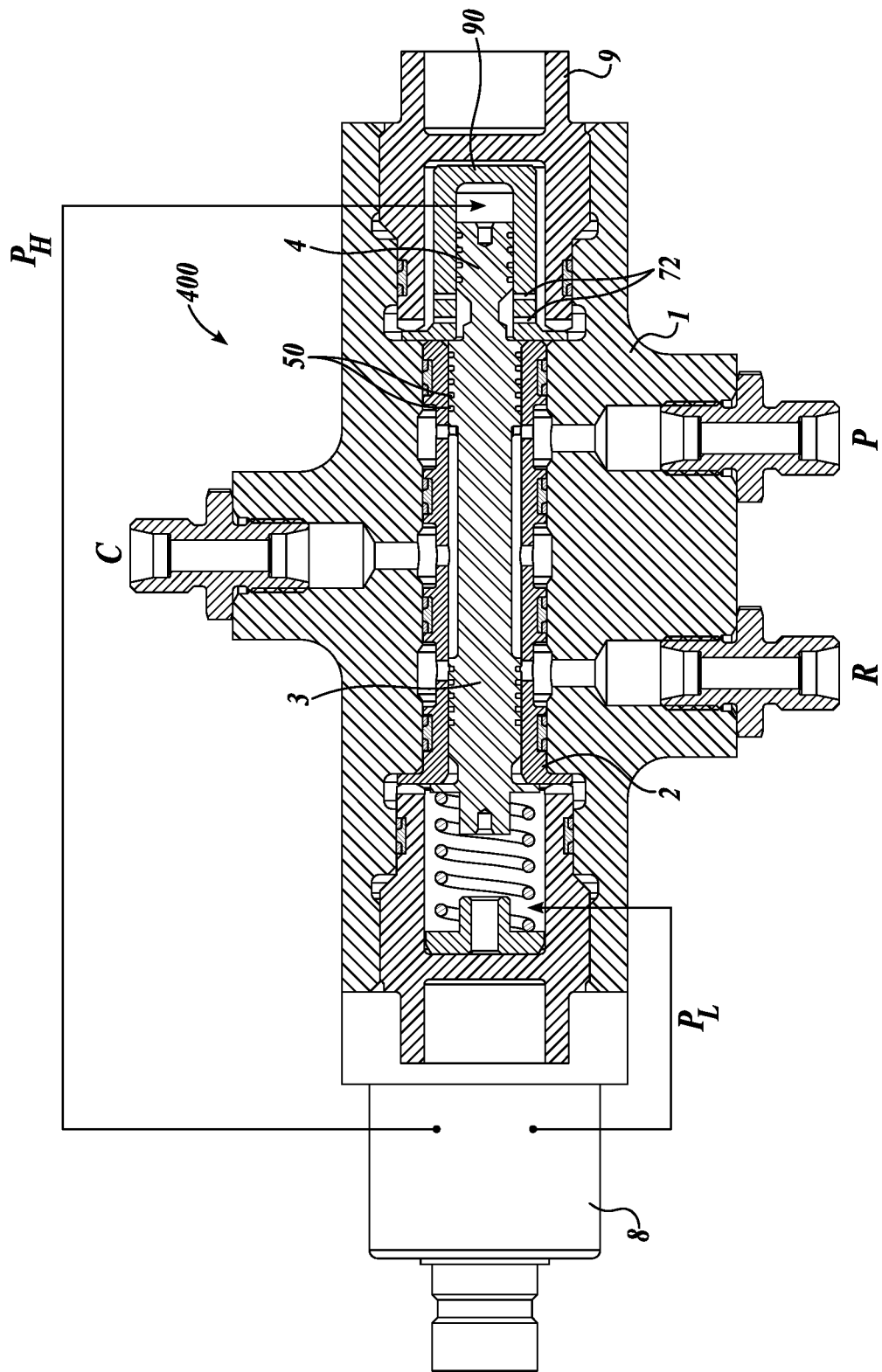
FIG. 9 is a cross-sectional view of a single spool-end hydraulic dampening valve in accordance with the present technology.

FIG. 9 is a cross-sectional view of a single spool-end hydraulic dampening valve 400 in accordance with the present technology. In the illustrated embodiment, the viscous damper 4 is integral with the spool 3. In some embodiments, the viscous damper 4 may be partially enclosed in a cushion 90. In operation, the viscous force between the viscous damper 4 and the cushion 90 reduce the incidence and/or severity of the pressure spikes. In some embodiments, the cushion 90 may include one or more holes 72 that allow the pilot fluid to reach the space between the cushion 90 and the spool 3. The cushion 90 may be attached to the valve body 1 or the sleeve 2.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A hydraulic valve for dampening pressure spikes, comprising:
   a spool configured to move axially inside the hydraulic valve;
   a sleeve configured to at least partially house the spool, wherein a location of the spool with respect to the sleeve determines a flow of a working fluid through the hydraulic valve; and
   a viscous damper at least partially housed inside an opening in the spool, wherein the viscous damper comprises a self-centering feature configured to align the viscous damper with an axial direction of the spool, wherein the self-centering feature comprises a round end seated against correspondingly round end shaped surface of an end cap, wherein the viscous damper is generally round, wherein the viscous damper includes at least one axial non-circumferential groove that only partially extends along an axial direction of the viscous damper thus increasing a clearance between the viscous damper and the opening in the spool, wherein the groove is located entirely within a space that lies between the viscous damper and the opening in the spool, and wherein an entire length of the groove is parallel with a main longitudinal center axis of the valve, wherein a viscous friction between the viscous damper and the opening in the spool slows a motion of the spool.

2. The hydraulic valve of claim 1, wherein a pressure of a pilot fluid between the viscous damper and the opening in the spool slows the motion of the spool.

3. The hydraulic valve of claim 1, wherein the viscous damper is a first viscous damper and the opening is a first opening at a first side of the spool, the hydraulic valve further comprising a second viscous damper at least partially housed inside a second opening at a second side of the spool, wherein the second side of the spool is opposite from the first side of the spool, and wherein the viscous friction between the second viscous damper and the second opening in the spool slows the motion of the spool.

4. The hydraulic valve of claim 3, wherein the hydraulic valve comprises a first port (C1) in a fluid communication with a first end user and a second port (C2) in the fluid communication with a second end user, wherein in a first position of the spool, the first port (C1) and the second port (C2) are connected to a working fluid in a de-energized state, wherein in a second position of the spool the first port (C1) is connected to the working fluid in the de-energized state and the second port (C2) is connected to the working fluid in an energized state, and wherein in a third position of the spool the first port (C1) is connected to the working fluid in the energized state and the second port (C2) is connected to the working fluid in the de-energized state.

5. The hydraulic valve of claim 1, wherein the viscous damper includes a plurality of radial grooves configured to center the viscous damper within the opening in the spool.

6. The hydraulic valve of claim 5, wherein at least one of the plurality of radial grooves intersects with the at least one axial non-circumferential groove.

7. The hydraulic valve of claim 1, further comprising a bias spring configured to bias the spool.

8. The hydraulic valve of claim 1, wherein the sleeve comprises a scalloped opening configured to engage with a cooperating opening in the spool by a narrow side of the scalloped opening that limits a flow of the working fluid.

9. A method for dampening pressure spikes, comprising:
providing a pilot fluid at a predetermined pressure to a hydraulic valve;
in response to the pressure of the pilot fluid, axially moving a spool within a sleeve;
counteracting a motion of the spool by viscous friction of a viscous damper that is at least partially housed inside an opening in the spool, wherein the viscous damper comprises a self-centering feature configured to align the viscous damper with an axial direction of the spool, wherein the self-centering feature comprises a round end seated against correspondingly round end shaped surface of an end cap, wherein the viscous damper is generally round, wherein the viscous damper includes at least one axial non-circumferential groove that only partially extends along an axial direction of the viscous damper thus increasing a clearance between the viscous damper and the opening in the spool, wherein the groove is located entirely within a space that lies between the viscous damper and the opening in the spool, and wherein an entire length of the groove is parallel with a main longitudinal center axis of the valve; and
in response to axially moving the spool, providing a path for a working fluid through the hydraulic valve.

10. The method of claim 9, further comprising biasing the spool by a bias spring.

11. The method of claim 9, wherein the viscous damper includes a plurality of radial grooves configured to center the viscous damper inside the spool.

12. The method of claim 11, wherein at least one of the plurality of radial grooves intersects with the at least one axial non-circumferential groove.

13. The method of claim 9, wherein the viscous damper is a first viscous damper and the opening is a first opening at a first side of the spool, the hydraulic valve further comprising a second viscous damper at least partially housed inside a second opening at a second side of the spool, wherein the second side of the spool is opposite from the first side of the spool, and wherein the viscous friction between the second viscous damper and the second opening in the spool slows the motion of the spool.

14. The method of claim 13, wherein the hydraulic valve comprises a first port (C1) in a fluid communication with a first end user and a second port (C2) in the fluid communication with a second end user, wherein in a first position of the spool, the first port (C1) and the second port (C2) are connected to a working fluid in a de-energized state, wherein in a second position of the spool the first port (C1) is connected to the working fluid in the de-energized state and the second port (C2) is connected to the working fluid in an energized state, and wherein in a third position of the spool the first port (C1) is connected to the working fluid in the energized state and the second port (C2) is connected to the working fluid in the de-energized state.

15. The method of claim 13, further comprising:
biasing a first side of the spool with a first bias spring; and
biasing a second side of the spool with a second bias spring, wherein the second side is opposite from the first side.

* * * * *